United States Patent [19]

Mariner

[11] 3,799,397

[45] Mar. 26, 1974

[54] DISPENSING NOZZLE WITH SELECTABLE AUTOMATIC CUT-OFF

[76] Inventor: William H. Mariner, South Park Dr. Ext. Rt. 4, Salisbury, Md. 21801

[22] Filed: Sept. 5, 1972

[21] Appl. No.: 286,321

[52] U.S. Cl. .................................. 222/21, 141/225
[51] Int. Cl. ........................................... B67d 5/30
[58] Field of Search ........................... 222/2, 14–22; 174/5, 13; 73/202, 203; 141/198–229

[56] References Cited
UNITED STATES PATENTS

| | | | |
|---|---|---|---|
| 2,955,725 | 10/1960 | Niederst................................ | 222/17 |
| 2,557,336 | 6/1951 | Buchanan............................ | 141/223 |
| 725,557 | 4/1903 | Goodwin et al. ...................... | 222/14 |
| 3,341,075 | 9/1967 | Boudot................................ | 141/225 |

*Primary Examiner*—Stanley H. Tollberg
*Assistant Examiner*—Thomas E. Kocovsky
*Attorney, Agent, or Firm*—Larson, Taylor and Hinds

[57] ABSTRACT

A liquid dispensing nozzle of the type which automatically cuts off when the liquid level reaches a predetermined level is modified to cut off the liquid flow after a predetermined amount of liquid has been dispensed regardless of the liquid level. A closed bottom storage tube is placed into the spout, positioned to receive a proportion of the total liquid flow through the spout. When the liquid level in the storage tube reaches a predetermined level, it closes off the end of a selector tube which in turn creates a suction in the automatic cut-off mechanism to terminate the main liquid flow. The nozzle may also include a conventional liquid level cut-off. The storage tube can be wide open at its upper end to receive a proportion of the main flow, and the position of the bottom of the selector tube within the storage tube can be positioned either manually or by means of a coin operated mechanism. Alternatively, the selector tube can be stationary and the liquid can be metered through a valve into the storage tube in an amount proportional to the main flow.

16 Claims, 8 Drawing Figures

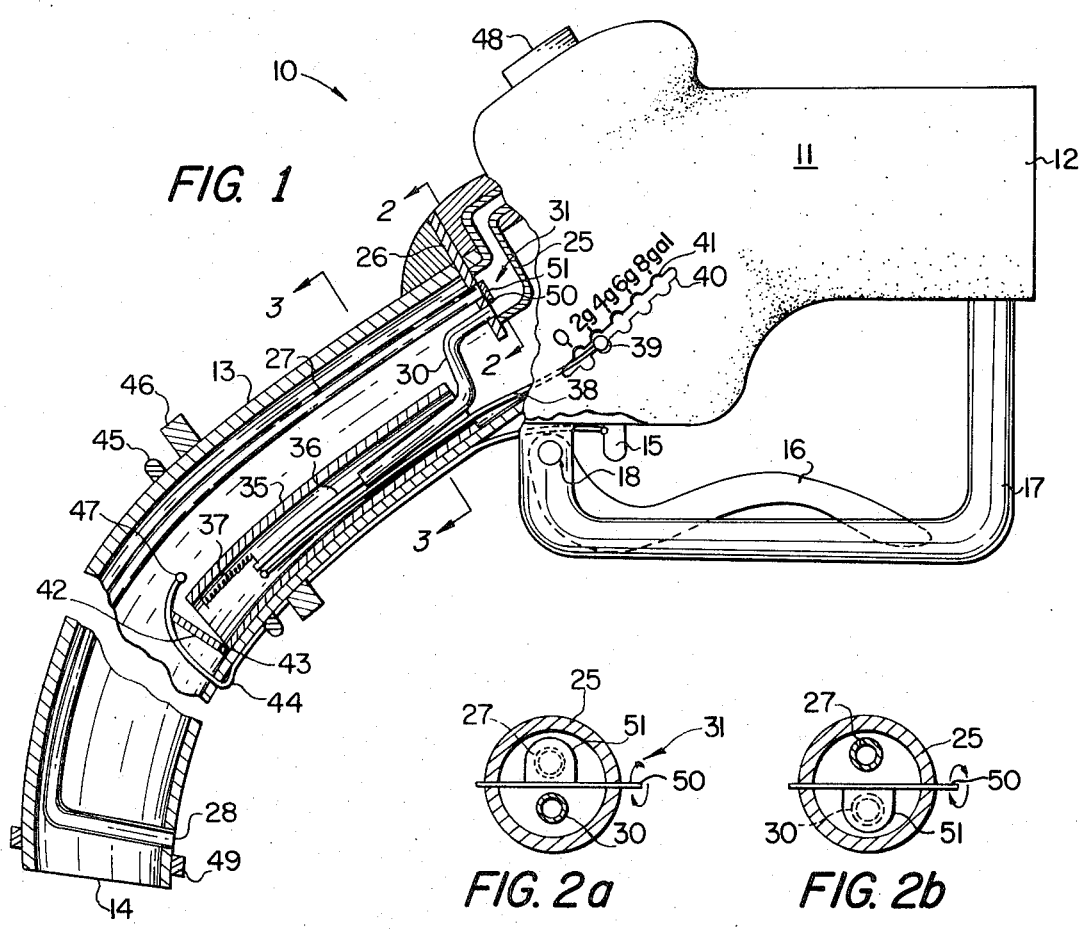
FIG. 1
FIG. 2a  FIG. 2b
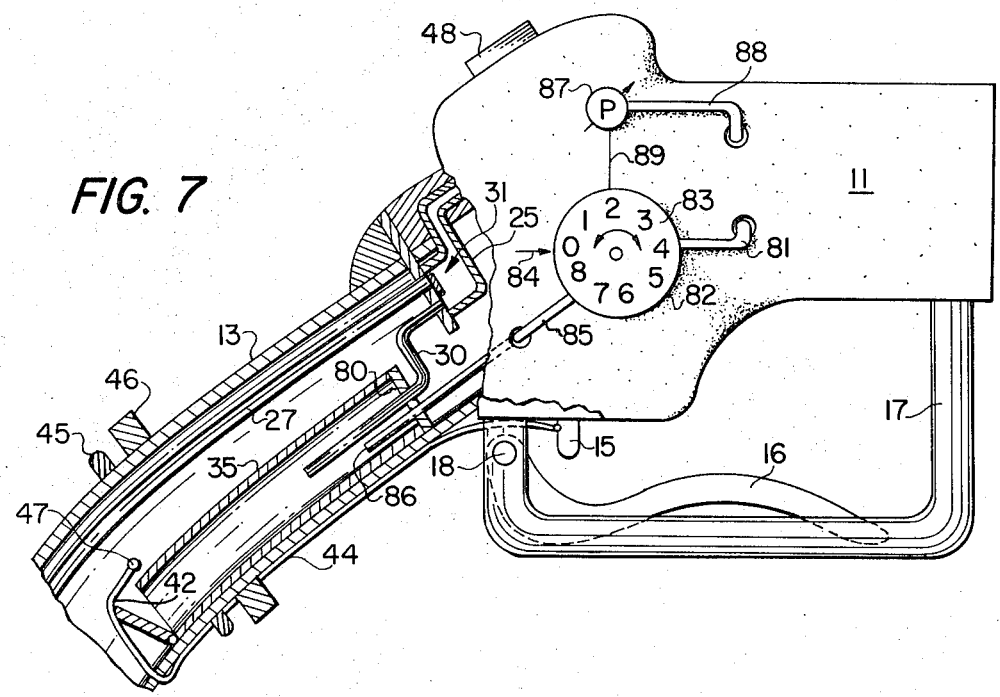
FIG. 7

DISPENSING NOZZLE WITH SELECTABLE AUTOMATIC CUT-OFF

BACKGROUND OF THE INVENTION

This invention relates to liquid dispensing nozzles, and more particularly it relates to automatic nozzles of the type normally used for the retail delivery of gasoline.

Nozzles of this general type are well known in which the flow of the liquid such as the gasoline is cut off automatically when the gasoline reaches a certain level in the tank. Such an apparatus is shown for example in the Pacey U.S. Pat. No. 3,035,616, issued May 22, 1962, the subject matter of which is incorporated by reference herein for the showing of a conventional liquid level sensitive automatic nozzle.

While such liquid level sensitive automatic nozzles are satisfactory when it is desired to fill the tank to the predetermined level, they do not perform the automatic cut-off function when it is desired to place into the tank a predetermined quantity of gasoline which may not fill the gas tank to the predetermined level.

Thus, it is a purpose of the present invention to provide a new and improved automatic nozzle which not only terminates the flow of liquid when a predetermined liquid level has been reached, but in addition thereto or in lieu thereof, automatically terminates the flow of liquid when a predetermined quantity thereof has been delivered.

SUMMARY OF THE INVENTION

Thus, it is a purpose of the present invention to provide an automatic nozzle which is operable to terminate the flow of liquid therethrough after a predetermined quantity of the liquid has been delivered therethrough.

Automatic nozzles of the type with which the present invention is concerned normally operate on the following principle. A main valve through the nozzle is opened by a conventional operating lever. A mechanism holds this valve in the open position. This mechanism is operated in response to a pressure differential, for example a pressure differential across a diaphragm. While the mechanism is holding the valve open, opposing sides of the diaphragm are in equilibrium. One side of the diaphragm, referred to hereinafter as the "control chamber," is in fluid communication through a tube which passes down through the spot to the exterior of the spout at the end thereof. When liquid reaches this tube opening, sub-atmospheric pressure is created in the tube, and hence also through the tube to the control chamber. A pressure differential is then created across the diaphragm, releasing the main flow valve and causing it to close.

In accordance with the present invention, a storage tube is provided, preferably in the spout, positioned so as to receive a predetermined proportion of the main gasoline flow through the spout. Into the upper end of this storage tube is inserted a selector tube opened at its bottom and in fluid communication with the control chamber of the automatic valve closing device. In operation, when liquid in the storage tube fills up to the bottom of the selector tube, suction is created in the control chamber in quite the same manner as if the control chamber were in communication with the conventional liquid level sensitive tube after the liquid had been filled up to the predetermined level.

Various arrangements are provided for selecting the quantity of liquid delivered to the storage tube, and hence also the quantity of liquid delivered through the main spout, before the bottom of the selector tube is closed off to cause closing of the main liquid flow valve. In one arrangement, this selector tube is slidable within the storage tube, thus varying the vertical position of the bottom thereof within the storage tube. Various arrangements are provided for moving the selector tube within the storage tube. According to one arrangement, the storage tube can be connected via a cable or the like to a knob which can be manually operated. In accordance with another arrangement, the selector tube can be connected via a cable or the like to a coin operated mechanism, whereby the level of the selector tube and hence also the quantity of liquid delivered through the main spout before cut-off can be set to correspond to the quantity of money placed into the coin mechanism.

According to another embodiment, the selector tube is at a fixed position within the storage tube. In this case, the top of the storage tube would be closed off to receive none of the main liquid as it flows through the spout. In lieu thereof, a portion of the main flow would be directed through a by-pass channel and through a metering valve and directly into the storage tube. By varying the size of the opening through the metering valve, one could then determine the amount of liquid to flow into the storage tube relative to the main liquid flow through the spout before the level of liquid in the storage tube reached the fixed location bottom of the selector tube.

In accordance with another feature of the invention, the automatic nozzle can be used in conjunction with the conventional liquid level cut-off mechanism, both the conventional tube through the spout and the said selector tube of the present invention leading to the suction chamber, the invention including valve means for permitting only one of the said conventional tube or the said selector tube to be connected to the suction chamber at any given time. In accordance with another feature of the invention, means are provided for securely positioning the spout within the gas tank, thus assuring that the storage tube is properly oriented during each delivery of liquid therethrough.

Thus, it is an object of this invention to provide a new and improved automatic liquid dispensing nozzle.

It is another object of this invention to provide a new and improved automatic liquid dispensing nozzle which terminates the flow of liquid when a predetermined quantity of liquid is passed therethrough, regardless of the liquid level.

It is another object of this invention to provide a new and improved automatic nozzle which terminates liquid flow either in response to a predetermined liquid level or alternatively in response to a predetermined quantity of liquid passing therethrough.

It is another object of this invention to provide a new and improved automatic liquid dispensing nozzle which terminates the liquid flow therethrough when a predetermined quantity of liquid has passed therethrough, as determined by a coin-operated mechanism.

It is another object of this invention to provide a new and improved automatic liquid dispensing nozzle having a storage tube in the spout thereof which receives a proportion of the total flow, and means in this tube for creating a suction in the control chamber of an automatic cut-off device so as to terminate the liquid flow through the main valve when a predetermined quantity of liquid has accumulated in the storage tube.

It is another object of this invention to provide a new and improved automatic liquid nozzle operable to terminate the liquid flow when a predetermined quantity of liquid has passed therethrough, wherein a storage tube within the spout is open to receive a proportional flow of the liquid through the spout.

It is another object of this invention to provide a new and improved automatic liquid dispensing nozzle of the type wherein liquid flow is terminated upon a predetermined quantity of liquid passing therethrough, this quantity being sensed by means of a storage tube which receives through a metering valve a proportion of the total liquid flowing through the spout.

Other objects and the advantages of the present invention will become apparent from the detailed description to follow, taken together with the accompanying drawings.

BRIEF DESCRIPTION OF THE DRAWINGS

There follows a detailed description of preferred embodiments of the invention to be read together with the accompanying drawings. It will be understood, however, that these embodiments and the accompanying drawings are provided only for purposes of illustration.

FIG. 1 is a side view of an automatic liquid dispensing nozzle including a conventional liquid level sensitive cut-off device, and modified to include features of the present invention, wherein the portion of the nozzle including the features of the present invention are shown in cross-section.

FIGS. 2A and 2B show two different positions of the portion of the invention taken along line 2—2 of FIG. 1.

FIG. 7 is a side view similar to FIGS. 1 and 4 but showing another embodiment of the invention.

DETAILED DESCRIPTION OF THE PREFERRED EMBODIMENTS

Figure 4:
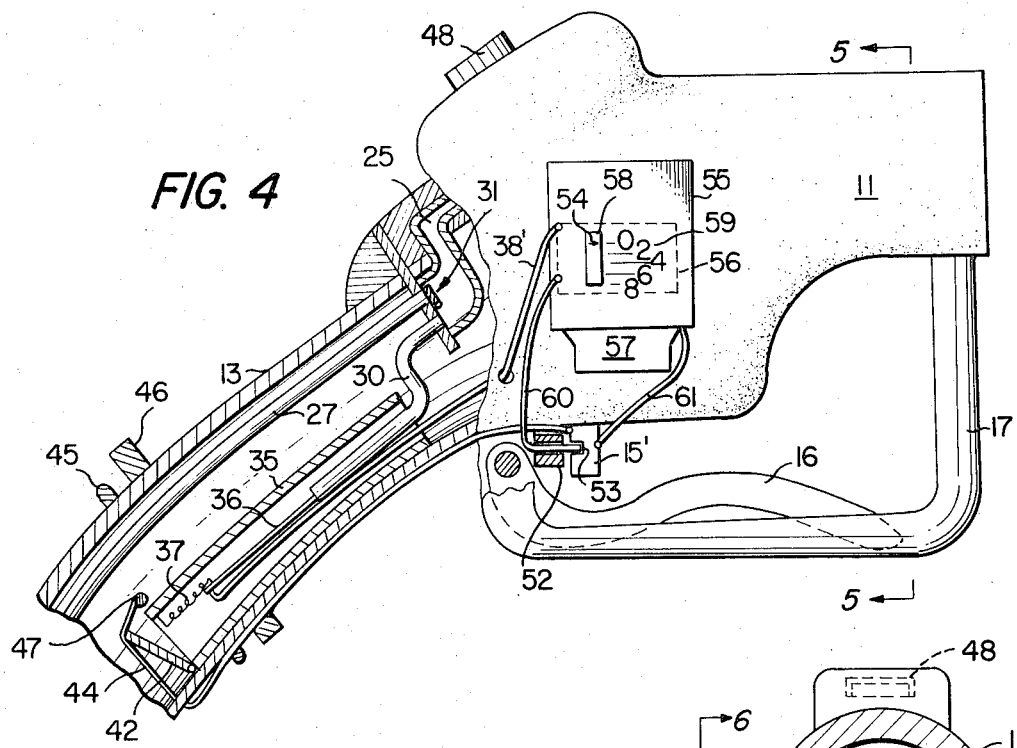
FIG. 4 is a side view similar to FIG. 1 but showing another embodiment of the invention.

Referring now to the drawings, like elements are represented by like numerals throughout the several views.

FIG. 1 shows a dispensing nozzle 10 having a body portion 11, a main liquid inlet 12, a delivery spout 13 and an outlet end 14. The liquid such as gasoline is delivered through the dispensing nozzle by raising the operating rod 15. This is accomplished by raising the lever 16 about its pivot connection 18 such that its upper surface engages and urges upwardly the rod 15. Elements 15 and 16 are located within the confines of a conventional lever guard 17.

The details of the main flow valve and its controlling elements within the body portion 11 will not be described in detail since they do not form a part of the present invention. For a detailed discussion of this operating mechanism, reference may be made to U.S. Pat. No. 3,035,615. However, the operation of this automatic mechanism will be described to the extent that its operation is necessary to understand the present invention. Within the body portion 11 is a main flow valve which is opened by moving rod 15 upwardly. A holding mechanism within body portion 11 holds the valve in the opened position. One modification of this prior device for the present invention is that this holding mechanism would also be constructed to hold upwardly the rod 15 while the main flow valve was held open. For example, the upper end of rod 15 which is not shown would be pivotably connected to the elements holding the valve open so as to move therewith. This mechanism which holds the valve open is connected to a diaphragm, the opposing forces on which are such that it holds the valve open. In its valve holding position at least one side of the diaphragm, referred to hereinafter as the control chamber, will be subjected to atmospheric pressure. In the conventional device, this control chamber is connected via a tube such as tube 27 in FIG. 1 to an opening 28 at the lower exterior surface of the spout. When liquid rises to such a level that it covers the opening 28, sub-atmospheric pressure is felt in the tube leading to the control chamber, thus changing the control chamber from atmospheric to sub-atmospheric pressure. As a result of this change, the diaphragm is moved, moving elements with it to release the main valve, permitting it to close. The rod 15 would then move downwardly to its original position. The conventional mechanism also includes a manual fluid cut-off button 48 which may be operated to release the holding mechanism and permit the main valve to close.

Referring now to FIG. 1, the dispensing nozzle 10 includes a passage 25 leading from the said control chamber of the automatic cut-off device to a partition 26. Passing through this partition in fluid communication with passage 25 are a pair of tubes 27 and 30. Tube 27 is a conventional liquid level sensing tube and leads to an opening 28 at the lower exterior of the spout 13. The other tube 30 is a selector tube of the present invention.

In accordance with the present invention, there is provided a storage tube 35. The lower end of this tube includes a bottom lid 42 pivotable about pivot connection 43. It is shown in the open position. However, when the valve is operated by moving the rod 15 upwardly, cable 44 which is connected at one end to the rod 15 and connected at its other end to a fixed pin 47 will move against the bottom lid 42 causing it to close the bottom of storage tube 35. Within storage tube 35 there is provided a slidable tube 36, the upper end of which is telescopically positioned within selector tube 30. Its bottom is of course open. A spring 37 fixed at one end to the tube 35 near the bottom thereof and fixed at its other end to the tube 36 urges the tube 36 to its lowermost position. A cable 38 also fixed to the lower end of tube 36 extends upwardly through tube 35 and through the body portion and out through the wall thereof where it connects with a knob 39. This knob 39 is movable within a slot 40, which slot has a plurality of recesses 41 for receiving and holding the knob 39 in a fixed position corresponding to the number of gallons designated adjacent each recess 41.

Obviously, it would be desirable to operate only one of the tubes 27 or 30 at any given time. For this purpose, a valve mechanism 31 is provided for closing the entrance of either one of tubes 27 or 30 into passage 25. This valve mechanism is shown in greater detail in FIGS. 2A and 2B, the former of which shows the valve in a position to connect tube 30 with tube 25, this corresponding to the elements as shown in FIG. 1, and the latter of which shows the valve in the other position so as to connect tube 27 with passage 25. The valve includes a valve element 51 connected to a rod 50 which is turnably mounted within body portion 11 so as to turn the element 51 between the two illustrated positions. The rod 50 would of course extend to the exterior of the body portion and be connected to a knob (not shown) whereby the operator could simply turn the valve manually to one position or the other.

In operating this type of device, it would of course be important to properly orient the spout 13 within the tank being filled. For this purpose, there may be provided a mechanism for attaching the spout into the holes vacated by the gas tank cap. These may include protrusions 45 which would fit through these openings and which would cooperate with an annular flange 46 for holding the spout in place. In addition, a magnetic means may be provided for holding the spout in place. For example, the protrusions 45 could be eliminated and flange 46 could be of a magnetic material so as to adhere to the top of the gas tank opening. Alternatively, if it is necessary to correctly orient the storage tube 35 relative to the vertical for each delivery, the element 46, as described above but with or without the element 45 could be located much closer to the outlet as shown schematically at 49 and it could include means for swiveling the spout 13 within the means 49, this in combination with a conventional leveling bubble or the like to be sure that the spout is correctly oriented relative to the vertical.

Many variations of the embodiment of FIG. 1 are of course apparent. For example, the knob 39 can be threadedly connected to the cable 38 by means of an eyebolt or a turnbuckle or the like so that the position of the lower end of tube 36 can be varied for a given number of gallons in the event that the price of gasoline changes.

Figure 3:
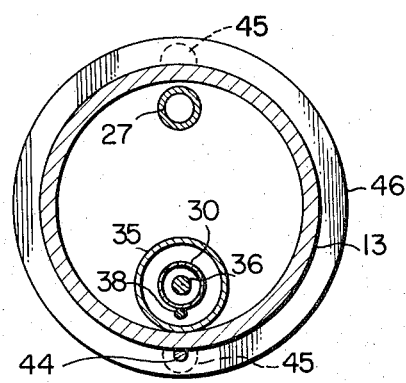
FIG. 3 is a cross-sectional view taken along line 3—3 of FIG. 1.

The embodiment of FIGS. 1-3 operates as follows. The operator would first turn the rod 50 to set the valve 31 into the desired type of operation. If the valve is moved to the position of FIG. 2B, the tube 27 is opened to passage 25, and the dispensing nozzle is a conventional liquid level sensitive nozzle. If however a desired quantity rather than a "fill-up" is desired, the valve 31 is turned to the position shown in FIGS. 1 and 2A. The operator then sets the knob 39 to the desired recess which represents gallons as indicated or possibly also monetary values. This will move the tube 36, and in particular, the lower end thereof to the desired position relative to the bottom of storage tube 35. The operator then opens the main valve by moving the lever 16 upwardly against rod 15, moving the latter into the body portion 11. As this happens, cable 44 would be urged against and hence close the bottom 42 of tube 35. Concurrently, the liquid such as gasoline would flow through the main valve and through the spout 13 and out the opening 14. The tube 35 would of course be precisely sized such that its upper end receives a predetermined proportion of the main flow through the spout 13. Thus for example the distance shown in FIG. 1 from the bottom of tube 35 to the bottom of tube 36 would represent a flow of two gallons through the spout 13. At this point liquid would cover the bottom of tube 36 transmitting subatmospheric pressure back through the tubes and the passage 25 to the control chamber, thus causing the main valve to close and the rod 15 to move downwardly as explained earlier. When this happens, the bottom lid 42 will be released to open and hence release the gasoline in the tube 35 so that the tube 35 will be empty for the next delivery.

Figure 6:
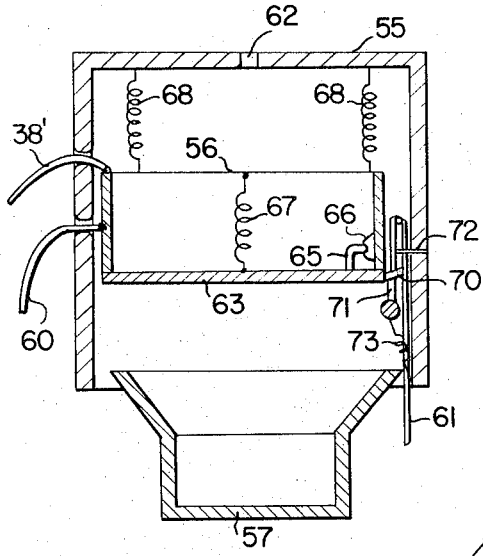
FIG. 6 is an enlarged sectional view taken along line 6—6 of FIG. 5.
Figure 5:
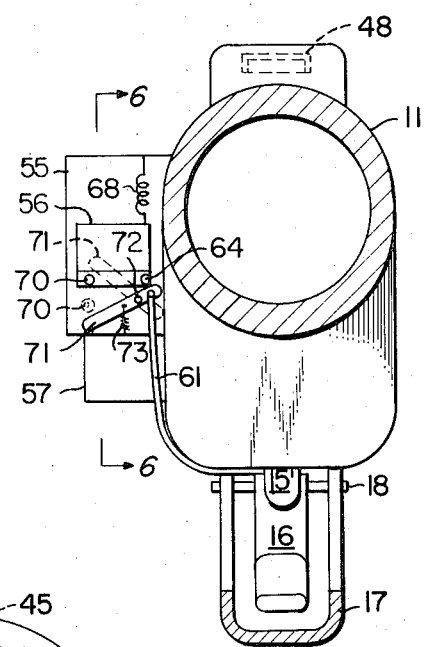
FIG. 5 is a cross-sectional view taken along line 5—5 of FIG. 4 but wherein the side wall of the coin mechanism has been removed to reveal the interior thereof.

FIGS. 4-6 illustrate another embodiment of the invention. This embodiment is similar to the embodiment of FIGS. 1-3 except that the means for manually operating the cable 38 are replaced by a coin operated mechanism. Referring to FIGS. 4-6, a coin dispenser casing 55 is fixed to the exterior of body portion 11. Vertically movable within casing 55 is an opened top inner liner 56. A coin receptacle box 57, also fixed to the body portion 11 has an open top positioned within the open bottom of casing 55. The cable leading to the bottom of tube 36 is referred to in this embodiment as 38'. As shown in FIGS. 4 and 6, in this embodiment the cable 38' passes outwardly through an opening in body portion 11 and up into and through the casing 55 where it is fixedly attached to the top of inner liner 56. A second cable 60 which also passes through an opening in casing 55 is fixedly connected at one end to the side of inner liner 56. At its other end it passes through a cylindrical guard 52 into a recess 53 in the operating lever which is referred to here as 15'. At its end within recess 53, the cable 60 would have formed thereon a hard thick end so as to effectively prevent upward movement of rod 15' while the said end of cable 60 is located in recess 53. Referring to FIG. 6, coins such as quarters are placed through the slot 62 and are received in the box 56. As the quarters accumulate, their weight moves the box 56 downwardly, against the force of springs 68. This accomplishes two things. First, it pulls the cable 38' into the opening in casing 55 thus raising the lower end of tube 36. Secondly, it pulls the cable 60 into its opening in casing 55, thus pulling its lower end out of the recess 53 in rod 15', thus releasing rod 15' for upward movement.

The casing 55, as illustrated in FIG. 4, is opaque, the inner box 56 being shown in dotted lines, except for an open window 58 which reveals an arrow 54 on the inner liner 56. As the inner liner moves downwardly, arrow 54 will move to a number designation 59 which may represent gallons or dollars. When the selected number of quarters have been placed through slot 62, the arrow 54 will be positioned across from the desired number and the cable 38' will have pulled the tube 36 upwardly by the corresponding amount.

At this point, the operator raises the lever 16 to raise the rod 15' to commence the flow of gasoline. In fact, up to this point the operation of the FIG. 4-6 embodiment is precisely the same as the operation of the FIGS. 1-3 embodiment except for the method of raising the tube 36.

In the FIG. 4-6 embodiment, however, a means must be provided for releasing the coins from the box 56, permitting them to fall into receptacle 57, thus releasing the coins and permitting the box 56 to move upwardly to its original position under the force of springs 68 to position the liner for a subsequent operation, and concurrently permitting the cables 38' and 60 to return to their FIG. 4 position wherein the cable 38' permits the spring 37 to carry the tube 36 to its lowermost position, and wherein the lower end of cable 60 will again prevent upward movement of rod 15' until a subsequent cycle.

This releasing means may take many forms. For example, in the type of automatic dispenser where the lever 16 is held in the raised position during delivery and is released to its original position only upon the completion of delivery, a cable connected to the bottom of box 56 can lead directly to a wedge which would fill the space between body portion 11 and lever 16 to prevent upward movement of the latter. In the present embodiment, however, this means comprises the following. A latch 65 fixed to the bottom 56 is resiliently held in a recess 66 which is rigid with the side of box 56. Extending out from bottom 63 is a resilient tip 70. This tip will permit a rod 71 to push it aside so that the rod can pass upwardly by it. However, when this rod 71 is moved onto tip 70 from above, it will move the entire bottom 63 downwardly, releasing element 65 from recess 66. Referring to FIG. 5, the lever 71 is shown in solid lines in its normal position. It is held in this normal position by a spring 73 (see also FIG. 6). At its right-hand end (referring to in FIG. 5), it is connected to a cable 61 which is connected at its opposite end to rod 15'. In FIG. 5, the upward position of box 56 and tip 70 are shown in solid lines and any position of tip 70 beneath its raised position is represented by the dotted circle 70. The rod 71 is mounted for turning movement on a pivot pin 72 which is fixed into the casing 55.

The above described elements operate in the following manner to release bottom 63. When the operator moves rod 15' upwardly by means of lever 16 to open the main valve, cable 61 is pulled downwardly, turning lever 71 clockwise about axis 72 to the dotted line position shown in FIG. 5. Lever 71 will remain in this dotted line position during liquid delivery. When the liquid flow is terminated and rod 15' moves downwardly, the cable 51 is released, thus causing lever 71 to move from the dotted line position to the solid line position under the force of spring 73. While the lever 71 simply passed by the tip 70 when it was being raised, it now exerts a force on this tip so as to release element 65 from recess 66, opening the bottom 63 against the force of spring 67. Once this has happened, the coins will hold bottom 63 downwardly until they are released, at which time bottom 63 will move upwardly under the force of spring 67 until element 65 is again held in the recess 66. The rod 71 as well as the remaining elements will then be in position for a subsequent operation.

FIG. 7 illustrates still another embodiment of the invention. This embodiment is similar to the first two embodiments except that the slidable tube 36 is eliminated. Thus, the gas flow will always terminate when the gas reaches the fixed location bottom of selector tube 30. Also in this embodiment the upper end of storage tube 35 is closed by a lid 80 so that in this embodiment gasoline flowing through the spout does not flow into the storage tube 35. Rather, in this embodiment a proportion of the main flow is taken off through a by-pass tube 81 and directed into a metering valve 82 and from there through a stationary tube 85 which leads back into the interior of body portion 11, through an opening in the closed lid so into storage tube 35. Valve 82 includes a turnable dial having numbers 83 thereon which register with an indicator 84 on the body portion 11. These numbers can of course represent quantity or monetary value. The valve 82 is not shown in detail as it may take the form of any well known metering valve of the type wherein turning one element varies the size of the liquid openings through the valve. For example, a conventional faucet valve operates in this manner. In this case, the flow through tube 81, the valve and tube 85 will of course be set to a predetermined proportion of the main flow such that when the liquid in storage tube 35 reaches the bottom of tube 30, the amount indicated on dial 83 will have been dispensed through nozzle 13.

The embodiment of FIG. 7 is operated in the same manner as the embodiment of FIG. 1 with respect to setting of the valve 31. In this case, in order to determine the quantity of liquid to be delivered, the operator simply turns the dial of valve 82 until the desired number is across from indicator 84. The main gas flow valve is then operated in the same manner by raising lever 16 to raise rod 15. When the liquid in storage tube 35 reaches the bottom of selector tube 30, the flow will be terminated in the manner described earlier.

One possible difficulty with the embodiment of FIG. 7 is that the flow through valve 82 might change, even for a given setting, if the pressure of the gasoline entering inlet 12 changes. This might happen for example if two dispensing nozzles are operated off of the same gasoline pump and the other dispensing nozzle is turned on or off. In this case, it might be necessary to adjust the opening in valve 82, even at a given setting, for changes in liquid pressure. This could be accomplished by sensing the pressure by means of pressure valve 87 which is in fluid communication with the main flow of gasoline through line 88. Any suitable means could be used to change the valve setting in response to pressure variations at gauge 87. Such means are shown diagrammatically by line 89.

In the preferred embodiments, use was made of cables for effecting various functions. Where it is desirable to avoid any manipulation of these cables, the portions thereof extending to the exterior of the spout and the body portion 11 can be enclosed in a sheath in much the same manner as a parking brake cable. This would prevent undesirable or unauthorized manipulation of the cable while concurrently permitting them to fill their functions. Moreover, in order to provide correct relative movement of the remote end of a cable relative to a proximate end thereof (such as correct movement of the tube 36) in response to movement of the cables 38 or 38' by means of knob 39 or liner box 56, respectively, it may be necessary to employ suitable pulleys such as block and tackle means in the cable.

The invention has been described with respect to a particular type of dispensing nozzle wherein the rod 15 is moved upwardly to open the main valve and lever 16 performs no important function other than to act as a means for raising rod 15. However, in other types of automatic dispensing nozzles the lever 16 fulfills a more important purpose in that it must be held upwardly while gasoline is flowing through the nozzle and it definitely moves downwardly when the main valve is closed. In this case, it will be understood that the various cables can be connected to the lever 16 for movement therewith rather than to the operating rod 15.

Although the invention has been described in considerable detail with respect to a preferred embodiment thereof, it will be apparent that the invention is capable

I claim:

1. A liquid dispensing nozzle including: a body portion having an inlet and a passageway therethrough, a nozzle spout communicating with said body passageway and providing a discharge outlet for the liquid, a valve in the body portion for controlling the flow of liquid therethrough, means for opening the valve, holding means for holding the valve open to permit liquid to flow therethrough, means defining a control chamber which renders the holding means inoperable and hence permits the valve to close when the control chamber is subjected to a vacuum pressure, a storage means, a means for accumulating in said storage means a known proportion of a liquid flowing through the spout to and through the discharge outlet thereof, an open bottom selector tube in the storage means, said selector tube being in fluid communication with said control chamber, whereby when liquid accumulates in the storage means to a level to cover the bottom of the selector tube, a suction pressure is communicated to the control chamber to render the holding means inoperable and hence close the valve, regardless of the level of the delivered liquid through the spot.

2. A liquid dispensing nozzle according to claim 1, said accumulating means comprising an adjustable metering valve for metering a predetermined proportion of said main liquid flow into said storage means.

3. A liquid dispensing nozzle according to claim 1, the bottom of the selector tube being stationary.

4. A liquid dispensing nozzle according to claim 3, said storage means being a storage tube located in the spout, the top of the tube being closed except for the passage therethrough of said selector tube and a tube leading to said metering valve, and the bottom of the storage tube being selectively openable to selectively release the liquid which has accumulated therein during each cycle of operation of the nozzle.

5. A liquid dispensing nozzle according to claim 3, including a pressure sensitive means for maintaining the flow through the metering valve constant for varying pressures in the main liquid flow line.

6. A liquid dispensing nozzle according to claim 1, including means for securing the spout in a tank opening during the delivery of the liquid therethrough.

7. A liquid dispensing nozzle according to claim 6, said securing means including a means for securing the spout into the opening in a gas tank vacated by the gas tank cap.

8. A liquid dispensing nozzle according to claim 1, said storage means comprising a storage tube in the spout.

9. A liquid dispensing nozzle according to claim 8, the bottom of the storage tube being selectively openable to selectively release the liquid which has accumulated therein during each cycle of operation of the nozzle.

10. A liquid dispensing nozzle according to claim 8, said selector tube leading from an open bottom located within the storage tube to a passageway, a second tube opened to the exterior of the spout in the vicinity of the discharge end thereof to sense when liquid has reached the discharge end of the spout, the other end of said second tube being in fluid communication with said passageway, said passageway leading from its connection with said selector and second tubes to said control chamber such that when sub-atmospheric pressure exists within the passageway, means connected to the control chamber render the holding means inoperable to permit the valve to close, and including a second valve operable to place only one of said selector or second tubes in communication with said passageway.

11. A liquid dispensing nozzle according to claim 8, the top of the storage tube being opened to receive the said known proportion of the liquid flowing through the spout, and the selector tube including control means for moving the lower end of the selector tube to different heights within the storage tube, the selected height thus determining the amount of liquid to be delivered into the storage tube, and hence the amount of liquid to be delivered through the spout, before the valve closes.

12. A liquid dispensing nozzle according to claim 11, and including means connected to the selector tube and extending out of the nozzle to be manually moved to manually move the lower end of the selector tube within the storage tube and hence determine the amount of liquid to flow through the spout before the valve closes.

13. A liquid dispensing nozzle according to claim 11, including a coin operated means responsive to the quantity of money deposited therein for determining the height of the lower end of the selector tube and hence also determining the height of the liquid to be delivered through the nozzle spout before the valve closes.

14. A liquid dispensing nozzle according to claim 13, said coin operated means including a casing, a liner within the casing, means for depositing coins through the casing into the liner, the liner being arranged to move downwardly in response to the weight of coins therein, and means connecting the liner with the selector tube such that as the liner moves downwardly, it moves the selector tube bottom upwardly in the storage means a proportionate amount.

15. A liquid dispensing nozzle according to claim 14, including means for preventing operation of the nozzle until at least some downward movement of the liner has occurred.

16. A liquid dispensing nozzle according to claim 15, including means for releasing coins from the liner into a fixed receptacle after operation of the nozzle.

* * * * *